April 24, 1934.  M. J. TRACY  1,956,085
SAFETY FLUSHING APPARATUS
Filed Aug. 19, 1932  2 Sheets-Sheet 1
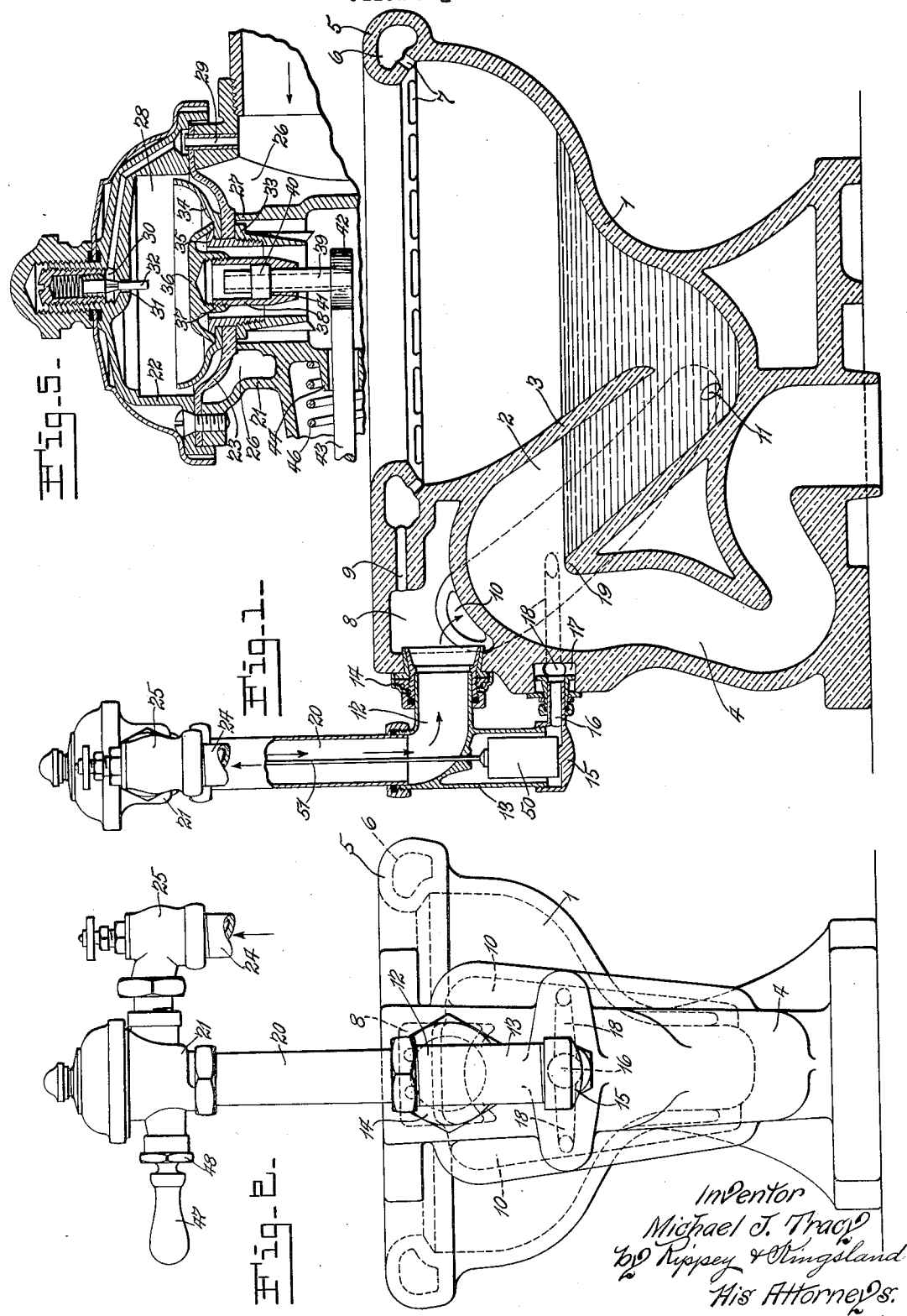

April 24, 1934.  M. J. TRACY  1,956,085
SAFETY FLUSHING APPARATUS
Filed Aug. 19, 1932  2 Sheets-Sheet 2
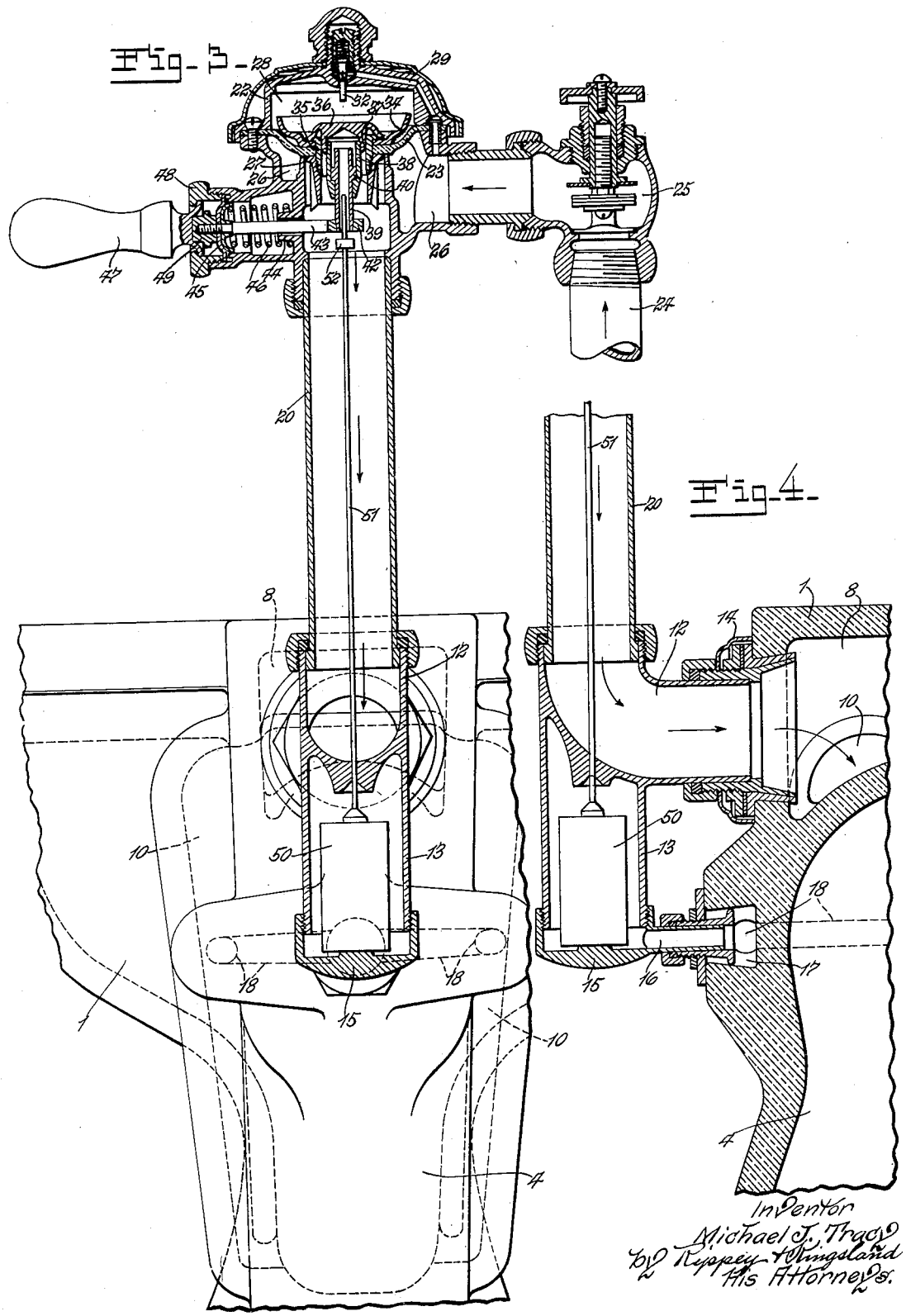

Patented Apr. 24, 1934

1,956,085

UNITED STATES PATENT OFFICE 1,956,085

SAFETY FLUSHING APPARATUS

Michael J. Tracy, St. Louis County, Mo., assignor to Pauly Jail Building Company, St. Louis, Mo., a corporation of Missouri Application August 19, 1932, Serial No. 629,411

3 Claims. (Cl. 4—81)

This invention relates to safety flushing apparatus having a valve controlling the flow of water to a bowl; and an object of the invention is to provide equipment operated automatically when the water in the bowl rises to or above a predetermined height to prevent further manipulation or operation of the valve, thus preventing flow of excess water to the bowl and preventing the bowl from overflowing.

It is a matter of knowledge that obstruction of the waste outlet from the bowl of a flushing apparatus of the type herein disclosed will also obstruct or retard the flow of water from the bowl, and that if an excess amount of water is admitted to the bowl when or after the waste outlet is obstructed, the water is likely to overflow from the bowl. Much damage has been caused in this way and the problem has arisen of providing means designed and adapted for general use which will automatically control the supply valve in a manner to prevent the valve from being open when the water in the bowl is caused to rise to or above a predetermined height as a result of the waste outlet from the bowl becoming choked or obstructed.

The principal object of the invention is to provide means for this purpose which will operate or be operated automatically and as an incident to the choking or obstruction of the waste outlet from the bowl and the constant rise of the water in the bowl to or above a predetermined height. This will prevent successive operation of the valve either intentionally or unintentionally, so that it is impossible for anyone to cause the bowl to overflow when or after the waste outlet from the bowl becomes choked or obstructed.

Other objects will appear from the following description, reference being made to the accompanying drawings, in which—

Fig. 1 is a vertical front to rear section of the bowl showing a part of the valve control device that is operated automatically and as an incident to the retention of an excessive amount of water in the bowl.

Fig. 2 is a rear elevation of the invention.

Fig. 3 is an enlarged vertical sectional view of the complete valve and valve operating device in connection with the water supply pipe.

Fig. 4 is an enlarged sectional view similar to Fig. 1.

Fig. 5 is an enlarged sectional view illustrating details of the valve device.

The bowl in connection with which the invention is shown and with which the invention cooperates and which to that extent constitutes a cooperative part of the invention may be made of porcelain, or other vitreous materials, or different substances, as desired. In the embodiment shown, this bowl comprises a water basin 1 having an outlet opening 2 into which the water and substances from the bowl 1 pass below the lower edge of a partition 3 which cooperates with the walls of the bowl 1 to form the outlet passage 2. The passage 2 opens into the waste outlet 4 communicating with any discharge conduit or sewer.

The upper end of the bowl is formed integrally with a tubular wall 5 forming a passage 6 into and through which the water from the supply pipe flows and from which the water is discharged through numerous openings 7 in order to wash and cleanse the inner surface of the wall of the bowl and drive the contents of the bowl out through the outlet passage 2 and the waste outlet 4.

A water receiving chamber 8 at the rear of the bowl discharges water into the tubular passage 6 through one or more passages 9, so that the water is driven through the passage 6 and through the openings 7 with some force due to the pressure of the water from the water supply main.

Two opposite passages 10 from the chamber 8 have openings 11 near the bottom of the bowl 1 and within the communication from the bowl 1 to the outlet passage 2. Water being forced from the passages 10 and openings 11 rises through the outlet passage 2 and causes the water entering the bowl to be siphoned therefrom through the outlet passage 2 and the waste outlet 4 until the level of the water in the bowl descends to the lower edge of the partition 3.

A fitting comprising a tubular elbow 12 and a downwardly extended chamber 13 is attached to the rear of the bowl. The end of the elbow 12 opens into the chamber 8 through attaching fittings 14. A lower end wall member 15 is attached to the lower end of the chamber 13 and has a tubular extension 16 opening into a chamber 17 in the wall of the bowl and thence through passages 18 into the passages 10 preferably above the normal level of the water in the bowl. The normal level of the water in the bowl is at the overflow lip 19. In any event, it is desirable that the lower end of the chamber or enclosure formed by the members 13 and 15 be above the normal level of the water in the bowl, which is determined by the height of the lip 19.

The lower end of a pipe 20 opens into the upper end of the elbow 12 and has in connection with its upper end of the lower end 21 of a valve housing. The upper member of the valve housing comprises a dome 22, the periphery of a flexible diaphragm member 23 being secured between the housing members 21 and 22.

A water supply pipe 24 opens through a valve regulator device 25 into a chamber 26 in the housing member 21 below the diaphragm 23 and surrounding the upwardly extended valve seat 27 upon which a central circular portion of the diaphragm seats. A chamber 28 is thus provided above the diaphragm 23 and within the housing member 22.

A passage 29 from the chamber 26 through the wall of the housing member 21, through the diaphragm 23 and through the wall of the housing member 22 opens into a chamber 30 in the upper portion of the wall of the housing member 22 so as to admit water to said chamber 30 from the chamber 26. A passage 31 from the chamber 30 opens into the chamber 28 and water is admitted from the chamber 30 into the chamber 28 by restricted flow controlled by a regulator valve 32 mounted in the opening 31.

The diaphragm 23 has a central opening and the marginal portion of said diaphragm around said opening is clamped between a lower clamping valve member 33, a ring 34 and a clamping element 35. The clamping element 35 screws into the lower member 33 and engages upon the ring 34, thus clamping said parts together and upon the diaphragm 23.

The area of the upper surfaces of the diaphragm 23 and the ring 34 within the housing member 22 is greater than the area of the under surface of the diaphrgam member 23 forming the upper wall of the chamber 26. When the device is idle, the chamber 28 is filled with water passing thereto through the passages 29 and 31 and is subjected to the same pressure as the pressure in the chamber 26. Accordingly, the valve will be held closed because an equal amount of pressure per square inch is applied to both sides of the valve and the area of the upper side of the valve within the chamber 28 is greater than the area of the valve above the chamber 26. A pilot valve member 36 is seated upon the ring 34 and is operative to open and to close the opening through the clamping member 35, constituting a part of the valve controlling flow of water from the chamber 26 to the chamber 28. The valve 36 has a tubular part 37 extending downwardly into the clamping member 35. A tube 38 is screwed into the downward extension 37 and a tube 39 extends upwardly into the tube 38 for vertical sliding movements. A flange 40 on the tube 39 seats on and is supported by a shoulder 41 within the tube 38. A circumferential flange or ring 42 is rigid with the lower end of the tube 39 in position to be engaged by a stem 43. The stem 43 extends through the wall of the valve housing 21 and is supported at its inner end by a guide 44 and at its outer end by a diaphragm supporting structure 45. A spring 46 mounted between the diaphragm supporting structure 45 and the wall of the housing 21 actuates the stem outwardly. A lever 47 is mounted for oscillation in a support 48 and cooperates with a member 49 attached to the outer end of the stem 43, so that when said lever 47 is oscillated or swung in any direction, it will push the stem 43 inwardly. This inward movement of the stem 43 causes said stem to engage the flange or ring 42 and thereby push the tube 39 to an inclined position, thus raising one edge of the valve 36 and permitting water to flow from the chamber 28 into the pipe 20 faster than water can enter said chamber 28 through the passages 29 and 31. This discharge of the water from the chamber 28 reduces the pressure against the upper side of the valve member 23 below the degree of pressure against the under side of said valve member 23 with the result that the water in the chamber 26 opens the valve member 23 and permits water to flow from the chamber 26 into the pipe 20 and thence through the fitting 12, the chamber 8, the passage 6 and ports 7 into the bowl 1; and also permits water to flow from the chamber 8 through the passages 10 and openings 11 to force water upwardly through the outlet passage 2 and causing water and the contents of the bowl 1 to be siphoned out. The raising of the valve member 23 by the pressure of the water against the under side thereof as described also raises the valve member 35 and thereby the tube 39. The tube 39 raises the ring or flange 42 above the end of the stem 43, thereby permitting the valve 35 to resume its seat. Water continues to flow into the chamber 28 through the passages 29 and 31, with the result that the valve member 23 is forced downwardly on its seat irrespective of whether or not the lever 47 has been released If the lever 47 is held in an operated position to hold the pin 43 inwardly, the ring or flange 42 will seat upon said pin 43 and will not tilt the valve 35 but will permit said valve to remain closed. This is because the tube 39 is capable of upward sliding movements in the tube 38.

Also if the lever 47 is released, the valve member 23 will close in the same way after a predetermined amount of water has been discharged into the pipe 20 and thence into the bowl 1. The amount of such water that may be discharged into the pipe 20 and thence into the bowl 1 is determined by the length of time required to fill the chamber 28 and the length of time required to fill said chamber 28 may be determined and regulated by adjustment of the regulator device 32.

A float device 50 is mounted in the chamber 13 and has a stem 51 extending upwardly through the wall of the fitting 12 and into the lower end of the tube 39. This stem 51 does not interfere with the operation of the tube 39 by the stem 43. A collar 52 is attached to the stem 51 adjacent to the lower end of the tube 39, so that when the float device 50 is raised, the collar 52 will engage the lower end of said tube 39 and will move said tube 39 upwardly far enough to support the ring or flange 42 above the end of the stem 43. When the ring or flange 42 is supported above the end of the stem 43, the lever 47 may operate said stem indefinitely and wthout opening or disturbing the valve 35.

Accordingly, should the waste outlet 4 become obstructed or clogged so as to retain an abnormal amount of water in the bowl 1, the passages 10 will be kept filled with water to the height of the water in the bowl. Water from the passages 10 will flow through the passages 18 into the chamber 17 and thence through the passage 16 into the chamber 13 and thereby raise the float 50. This raising of the float 50 by the water entering the chamber 13 causes the collar 52 to raise the ring or flange 42 above the end of the stem 43, so that operation of the lever 47 will not open the valve 35. This makes it impossible to discharge additional water into the bowl so long as the bowl retains an excessive amount of water.

When the water is drained from the bowl and from the passages 10 to a level below the openings to the passages 18, the water will flow from the chamber 13 and permit the float to drop or move downwardly to its lower position. The downward movement of the float carries the collar 52 beyond and out of engagement with the lower end of the tube 39 and permits the tube 39 to move downwardly to its lower position and place the flange or ring 42 in position to be engaged by the stem 43 when the lever 47 is again operated.

Accordingly, it is now clear that my invention obtains all of its intended objects and purposes efficiently and satisfactorily and is capable of general use. It is also designed and adapted for satisfactory use in institutions and other places in which intentional attempts are sometimes made to flood the buildings or rooms by choking or obstructing the waste outlets.

The construction and arrangement of the parts comprising the invention may easily be varied within the scope of equivalent limits without departure from the nature and principle thereof. I contemplate such variations as may be found desirable and without restricting myself in any unessential particulars, what I claim and desire to secure by Letters Patent is:

1. In an apparatus of the character described, a bowl to be flushed and having an outlet passage from the bottom and a passage around the upper end of the bowl opening into the upper portion of the bowl, wall structure integral with and forming a chamber at the rear of the upper end of the bowl opening into said second passage, wall structure forming a flushing passage from said chamber into the influent end of said outlet passage, a water supply pipe opening into said chamber, means forming a float chamber below said pipe, means forming a passage from said flushing passage into the lower end of said float chamber, mechanism controlling the flow of water through said supply pipe into said chamber, and a device in said float chamber and operated by the water in said float chamber for controlling operation of said mechanism.

2. In an apparatus of the character described, a bowl to be flushed and having an upwardly extended outlet passage from the bottom and a passage around the upper end of the bowl opening into the upper portion of the bowl, a lip at one side of said outlet passage determining the normal level of the water in the bowl, wall structure integral with and forming a chamber at the rear of the upper end of the bowl opening into said second passage, wall structure forming a flushing passage from said chamber into the influent end of said outlet passage, a water supply pipe opening into said chamber above said lip, means forming a float chamber below said pipe and a passage from said float chamber opening into said flushing passage above the horizontal plane of said lip, mechanism controlling the flow of water from said supply pipe into said chamber, and a device in said float chamber and operated by water in said float chamber for rendering said mechanism inoperative when a sufficient amount of water is forced into said float chamber from said flushing passage to operate said float device effectively.

3. In an apparatus of the character described, a bowl to be flushed and having an outlet passage, a lip at one side of said outlet passage determining the normal level of water that will be retained in the bowl, wall structure in connection with said bowl forming a downwardly extended passage having its lower end opening into the influent end of said outlet passage and having its upper end above said rib, a water supply pipe for supplying water to said downwardly extended passage, mechanism controlling the flow of water through said supply pipe, a float chamber in connection with said supply pipe, a passage from the lower end of said float chamber opening into said downwardly extended passage above the horizontal plane of said lip for conducting water into said float chamber when said outlet passage becomes choked preventing proper flow of water therethrough from the bowl, and a float device in said float chamber operated by water entering said float chamber to prevent effective operation of said mechanism when water is retained in the bowl substantially above the plane of the opening from said downwardly extended passage into said last named passage.

MICHAEL J. TRACY.